(12) United States Patent
Sawada (10) Patent No.: US 7,200,262 B2
(45) Date of Patent: Apr. 3, 2007

(54) 3-DIMENSIONAL IMAGE PROCESSING METHOD, 3-DIMENSIONAL IMAGE PROCESSING DEVICE, AND 3-DIMENSIONAL IMAGE PROCESSING SYSTEM

(75) Inventor: Yasuhiro Sawada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 10/321,461

(22) Filed: Dec. 18, 2002

(65) Prior Publication Data

US 2003/0128207 A1    Jul. 10, 2003

(30) Foreign Application Priority Data

Jan. 7, 2002    (JP) .............................. 2002-000927

(51) Int. Cl.
*G06K 9/00* (2006.01)

(52) U.S. Cl. ...................... 382/154; 382/162; 345/426; 345/582

(58) Field of Classification Search ................ 382/154, 382/162; 345/426, 582
See application file for complete search history.

(56) References Cited

U.S. PATENT DOCUMENTS 6,654,013 B1 *  11/2003  Malzbender et al. ......... 345/426
6,677,956 B2 *   1/2004  Raskar et al. ................ 345/581
6,765,573 B2 *   7/2004  Kouadio ...................... 345/426
7,106,325 B2 *   9/2006  Ritter et al. ................. 345/426

OTHER PUBLICATIONS

Sato et al., "Object Shape and Reflectance Modeling from Observation", Computer Graphics Proceedings, Annual Conference Series, pp. 379-387 (1997).

* cited by examiner

Primary Examiner—Bhavesh M. Mehta
Assistant Examiner—John B. Strege
(74) Attorney, Agent, or Firm—Fitzpatrick, Cella, Harper & Scinto (57) ABSTRACT

Illumination light having a 2-dimensional luminance distribution is used for obtaining photographed image data, and surface attributes of a real object are estimated based on photography environment information such as information relating to the luminance distribution of the illumination light at the time of photography, along with the photographed image data. This solves a problem with 3-dimensional image processing devices which obtain information relating to surface attributes of a real object from photographed image data obtained by photographing the real object along with the 3-dimensional shape of the real object and reproduce the object as a 3-dimensional image on a display screen, wherein specular reflection may not be captured in the photographed image data with objects having metal glossiness or the like where the specular reflection only occurs at an extremely narrow angle range at the time of obtaining the surface properties, resulting in erroneous information with no specular reflection being input. Thus, photographed image data of the real object is obtained without failing to pick up any specular reflection light.

3 Claims, 7 Drawing Sheets

$$\begin{cases} R = C_{dR} \cos\theta + C_s \cos^n \rho \\ G = C_{dG} \cos\theta + C_s \cos^n \rho \\ B = C_{dB} \cos\theta + C_s \cos^n \rho \end{cases}$$

$$\begin{cases} R = C_{dR} \cos\theta + C_s' \exp\left(-\dfrac{\rho^2}{2\sigma'^2}\right) \\ G = C_{dG} \cos\theta + C_s' \exp\left(-\dfrac{\rho^2}{2\sigma'^2}\right) \\ B = C_{dB} \cos\theta + C_s' \exp\left(-\dfrac{\rho^2}{2\sigma'^2}\right) \end{cases}$$

FIG. 8

$$\begin{cases} R = C_{d_R} \cos\theta + C_s \exp\left(\dfrac{\rho^2}{2\sigma^2}\right) \\ G = C_{d_G} \cos\theta + C_s \exp\left(\dfrac{\rho^2}{2\sigma^2}\right) \\ B = C_{d_B} \cos\theta + C_s \exp\left(\dfrac{\rho^2}{2\sigma^2}\right) \end{cases}$$

FIG. 9

THE FOLLOWING PROCESSING FOR EACH COLORING PORTION CONFIGURING 3-DIMENSIONAL SHAPE MODEL — S21

COMPILE CORRESPONDING TABLE FOR ENTIRE IMAGE (DIRECTION OF CENTER OF LIGHT SOURCE, DIRECTION OF OBSERVATION, INTENSITY OF REFLECTION) — S22

FIT LUMINANCE-DISTRIBUTION-TYPE BI-DIRECTIONAL REFLECTANCE DISTRIBUTION FUNCTION — S23

OBTAIN LUMINANCE-DISTRIBUTION-TYPE BI-DIRECTIONAL REFLECTANCE CONSTANT — S24

CONVERT INTO BI-DIRECTIONAL REFLECTANCE CONSTANT, AND RECORD — S25

FIG. 10

$$\begin{pmatrix} R_1 \\ G_1 \\ B_1 \\ R_2 \\ G_2 \\ B_2 \\ \vdots \\ R_m \\ G_m \\ B_m \end{pmatrix} = \begin{pmatrix} \cos\theta_1 & 0 & 0 & \cos\rho_1 \\ 0 & \cos\theta_1 & 0 & \cos\rho_1 \\ 0 & 0 & \cos\theta_1 & \cos\rho_1 \\ \cos\theta_2 & 0 & 0 & \cos\rho_2 \\ 0 & \cos\theta_2 & 0 & \cos\rho_2 \\ 0 & 0 & \cos\theta_2 & \cos\rho_2 \\ \vdots & \vdots & \vdots & \vdots \\ \cos\theta_m & 0 & 0 & \cos\rho_m \\ 0 & \cos\theta_m & 0 & \cos\rho_m \\ 0 & 0 & \cos\theta_m & \cos\rho_m \end{pmatrix} \begin{pmatrix} C_{dR} \\ C_{dG} \\ C_{dB} \\ C_s \end{pmatrix} + \varepsilon$$

FIG. 11

$$\begin{pmatrix} R_1 \\ G_1 \\ B_1 \\ R_2 \\ G_2 \\ B_2 \\ \vdots \\ R_m \\ G_m \\ B_m \end{pmatrix} = \begin{pmatrix} \cos\theta_1 & 0 & 0 & \exp(\rho_1^2/2\sigma'^2) \\ 0 & \cos\theta_1 & 0 & \exp(\rho_1^2/2\sigma'^2) \\ 0 & 0 & \cos\theta_1 & \exp(\rho_1^2/2\sigma'^2) \\ \cos\theta_2 & 0 & 0 & \exp(\rho_2^2/2\sigma'^2) \\ 0 & \cos\theta_2 & 0 & \exp(\rho_2^2/2\sigma'^2) \\ 0 & 0 & \cos\theta_2 & \exp(\rho_2^2/2\sigma'^2) \\ \vdots & \vdots & \vdots & \vdots \\ \cos\theta_m & 0 & 0 & \exp(\rho_m^2/2\sigma'^2) \\ 0 & \cos\theta_m & 0 & \exp(\rho_m^2/2\sigma'^2) \\ 0 & 0 & \cos\theta_m & \exp(\rho_m^2/2\sigma'^2) \end{pmatrix} \begin{pmatrix} C_{dR} \\ C_{dG} \\ C_{dB} \\ C_{s'} \end{pmatrix} + \varepsilon$$

FIG. 12

3-DIMENSIONAL IMAGE PROCESSING METHOD, 3-DIMENSIONAL IMAGE PROCESSING DEVICE, AND 3-DIMENSIONAL IMAGE PROCESSING SYSTEM

BACKGROUND OF THE INVENTION

1. Field of the Invention

The present invention relates to a 3-dimensional image processing method, 3-dimensional image processing device, and 3-dimensional image processing system, and particularly relates to 3-dimensional image processing method, 3-dimensional image processing device, and 3-dimensional image processing system, wherein information of specular reflection is obtained without fail even when photographing objects with extremely narrow angle ranges of specular reflection.

2. Description of the Related Art

In the event of reproducing a real object as a 3-dimensional image using computer graphics, there is a technique used wherein images taken of the real object with a camera are applied to each portion of the real object being 3-dimensionally reproduced. With such a technique, multiple images taken from multiple directions are prepared so that the 3-dimensional image can be observed from various viewpoints, and images suitable for the viewpoints are selected at the time of reproduction, and applied to each portion of the shape of the 3-dimensionally reproduced real object.

However, there is a problem with this technique, in that reproduction can be made only regarding the illumination state used at the time of inputting data from the real object, and reproduction cannot be made under an illumination state which is different to that at the time of photography. Also, camera images already contain shadows and highlights, so further applying shadows and highlights to objects to which camera images have been applied results in an unnatural-appearing image.

Now, SIGRAPH Computer Graphics Proceedings, Annual Conference Seriec, 1997, pp. 379–387, "Object Shape and Reflectance Modeling from Observation" describes the following technique. At the time of inputting data from a real object, the surface attributes, which are change in the manner of reflection observed on the surface of each of the parts of the real object due to the direction of illumination and the direction of observation (photography), are represented as a BRDF (Bi-directional Reflectance Distribution Function) and thus held, so in the event that an illumination state is arbitrarily set at the time of reproducing the 3-dimensional image, a 3-dimensional image can be observed as if the real object had been placed under the arbitrarily set illumination state. Also, a technique has been proposed wherein predetermined reflection model functions are introduced as BRDF, so as to represent the surface attributes by a reflection constant substituted into the reflection model function.

With this technique, a predetermined reflection model function serving as a BRDF is applied to the reflection properties of each part of the real object obtained by photographing the real object, and the reflection properties of each part of the real object are represented by the reflection constant within the reflection model function, and thus held. At the time of reproducing the 3-dimensional image, observation conditions such as arbitrary illumination conditions, the line of sight, and so forth, are set, and reflections occurring at each of the parts of the real object under those conditions are computed from the held reflection constant and reflection model function, thereby enabling shadows and highlights which are natural under the set observation conditions to be realized.

Also, for the above-described reflection model function, a reflection model function wherein the reflection of light is taken to be a linear sum of scattered (diffuse) reflection components and specular reflection components and wherein the state of the surface can be expressed by multiple reflection constants each, is used. The Phong reflection model is a representative example of such.

However, in the event of reproducing 3-dimensional images by holding data of the real object in such a technique, there is the need to use a light source which can approximate point light sources and parallel (infinite-distance) light sources as the illumination light source for inputting data from the real object, due to the properties of the BRDF. The reason is that since the BRDF is a function which describes what sort of reflection light the surface of the real object creates upon incidence of illumination light at a constant incident angle, prediction becomes extremely difficult when using image data taken of a real object illuminated with an illumination light of which light source position cannot be determined.

In the event of using such a light source, specular reflection may not be observed in the photographed image data with real objects in the case of real objects with metal glossiness or the like wherein the specular reflection only occurs at an extremely narrow angle range, resulting in erroneous information with no specular reflection being input. In order to avoid this, photography of the image needs to be carried out at angle intervals smaller than the expansion of the specular reflection, but this in itself is a problem, since this greatly increases the amount of image data to be processed and troublesome photography tasks.

SUMMARY OF THE INVENTION

Accordingly, it is an object of the present invention to provide a 3-dimensional image processing method and device, capable of obtaining photographed image data of the real image by spreading the region wherein specular reflection occurs even with real objects wherein specular reflection is only observed in an extremely narrow angle range, by illuminating the real object with a light source having a luminance distribution with 2-dimensional expansion as observed from the surface of the real object, thereby preventing failure to detect specular reflection.

Also, in the event that photographed image data is obtained by an illumination light source having a luminance distribution with 2-dimensional expansion as observed from the surface of the real object, the data directly obtained from the photographed image data is data comprising multiple BRDFs overlaid (or a convoluted BRDF). A BRDF indicating reflection properties of the surface of the real object obtained with regard to illumination light not having 2-dimensional expansion is obtained by computation from the aforementioned data comprising multiple BRDFs overlaid, by inputting the photograph environment information at the time of photography (information relating to luminance distribution of the light source, information relating to properties or settings of the photography device which executes the photography, information relating to the position and direction of the real object and light source and photography device, and so forth).

Thus, failure to observe the specular reflection at estimated portions (color portions) of the surface attributes in the event that the specular reflection is sharp can be prevented, and proper surface attributes can be estimated in a stable manner, with a relatively small number of photographed images.

Also, prediction of the BRDF obtained from the obtained data in the event of observing with point light source can be facilitated, by setting a Gaussian distribution-type reflection model function as the reflection model function to apply to the BRDF, and using a light source having Gaussian distribution-type luminance distribution for the light source as well.

Further objects, features and advantages of the present invention will become apparent from the following description of the preferred embodiments with reference to the attached drawings.

BRIEF DESCRIPTION OF THE DRAWINGS

FIG. 10 shows a determinant wherein the Phong reflection model function has been applied with the first embodiment;

FIG. 11 shows a determinant wherein the Phong reflection model function has been applied with the first embodiment.

DESCRIPTION OF THE PREFERRED EMBODIMENTS

First Embodiment

Figure 1:
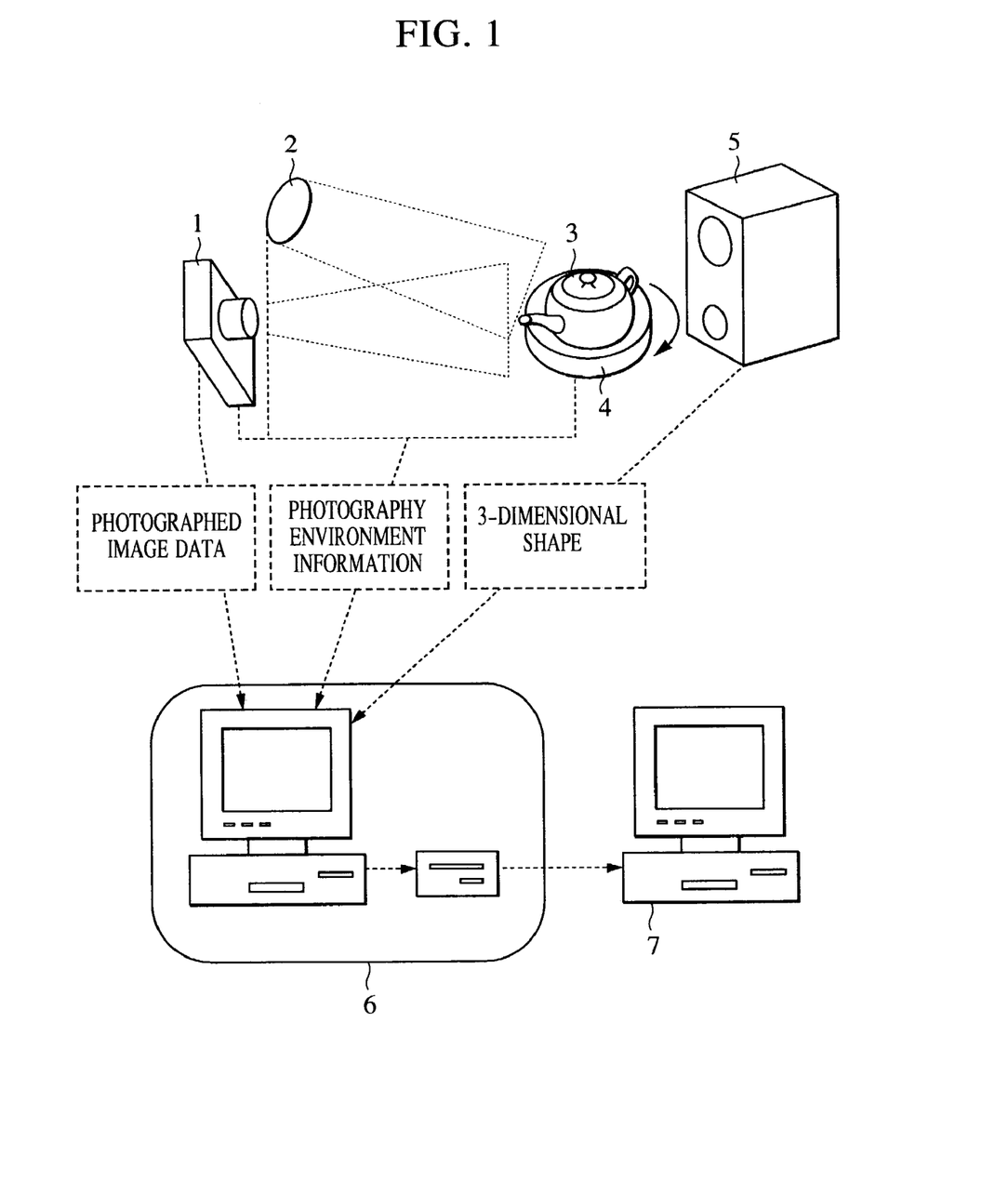
FIG. 1 is a configuration diagram of a 3-dimensional image processing system according to a first embodiment of the present invention.

FIG. 1 shows a configuration diagram of a 3-dimensional image processing system according to a first embodiment of the present invention. With the present embodiment, the luminance distribution of the reflected light at the surface of the real object that has been obtained by illuminating the real object with a light source having luminance distribution with a 2-dimensional expansion as viewed from the surface of the real object is deconvoluted using the luminance distribution of the illumination light, and the bi-directional reflectance distribution function BRDF is estimated to reproduce a 3-dimensional computer graphics. A Phong function is used here as the reflection model function for the BRDF.

The 3-dimensional image processing system according to the present embodiment is configured of the following components. A subject (real object) 3 is placed on a rotating stage 4. The subject 3 is illuminated by a planar area light source 2 having luminance distribution with a 2-dimensional expansion. A photography device 1 is a digital camera for performing photography with an imaging device such as a CCD, for example, which obtains photographed image data of the subject. Also, a 3-dimensional measuring device 5 measures the 3-dimensional form of the subject 3 using the laser radar method, slit light projection, pattern projection, etc. A 3-dimensional shape model, which is 3-dimensional shape information of the subject 3 based on the actual measurement data input from the 3-dimensional measuring device 5, is generated by a 3-dimensional image processing device 6. Also, the surface attributes (coloring information such as color, reflection properties, etc.) based on the photographed image data input from the photography device 1 is estimated at the 3-dimensional image processing device 6, and model data for the subject 3 is generated for the subject 3 from the surface attributes data and the 3-dimensional shape model. A computer graphics creating device 7 creates 3-dimensional computer graphics (a 3-D image) from the model data of the subject 3 created by the 3-dimensional image processing device 6, and displays the created 3-dimensional computer graphics.

The 3-dimensional shape model generated by the 3-dimensional image processing device 6 may be represented as polygonal surface model, for example, or as a collection of surface shape components of different shapes.

The 3-dimensional measuring device 5 and the photography device 1 are each positioned at locations distanced from the subject 3 by a certain degree, and perform 3-dimensional shape measurement and photograph of the subject 3 each time the subject 3 on the rotating stage 4 rotates a certain rotational angle, thereby obtaining and outputting actual measurement data of the 3-dimensional shape and photographed image data. Note that while in FIG. 1, the 3-dimensional measuring device 5 and the photography device 1 are separately configured, these may be configured as an integral unit. Also, the 3-dimensional measurements and the photography may be performed separately or at the same time.

Figure 2:
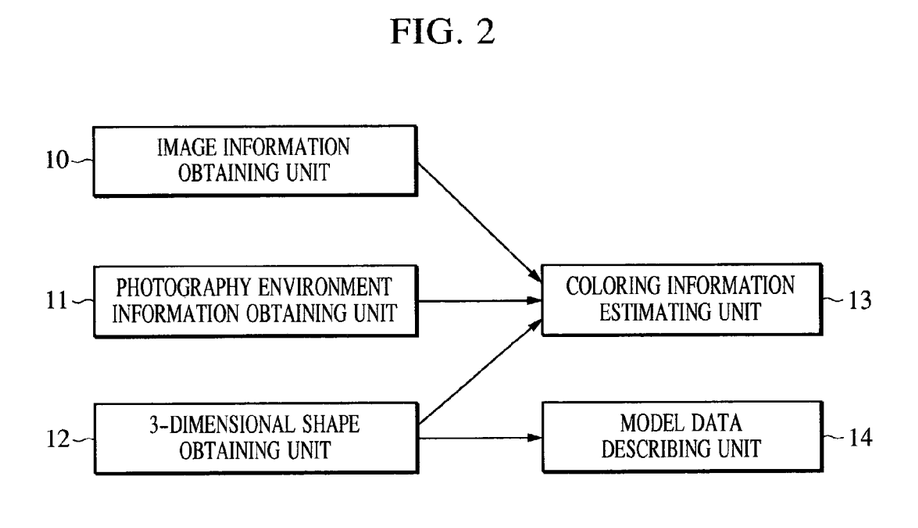
FIG. 2 is a block diagram illustrating the configuration of a 3-dimensional image processing device making up the 3-dimensional image processing system according to the first embodiment.

Next, each of the processes performed by the 3-dimensional image processing system will be described with reference to FIG. 2 along with FIG. 1. FIG. 2 illustrates the configuration within the 3-dimensional image processing device 6. The 3-dimensional image processing device 6 is configured of an image data obtaining unit 10 which obtains photographed image data, a photography environment information obtaining unit 11 which obtains information relating to the position and shape of the illumination light at the time of photography, the position of the photography device, etc., a 3-dimensional shape obtaining unit 12 which obtains a 3-dimensional shape model from the 3-dimensional measuring device 5, a color information estimating unit 13 which estimates the surface attributes, primarily from the photographed image data and the photography environment information and the like, and a model data storage unit 14 which stores the 3-dimensional shape model generated at the 3-dimensional shape obtaining unit 12.

As shown in FIG. 1, with the present embodiment, the model data storage unit 14 is provided as a model data storage device separately from the 3-dimensional image processing device proper. Also, at the color information estimating unit 13, surface attributes may be estimated taking into consideration the 3-dimensional shape model generated at the 3-dimensional shape obtaining unit 12, besides the photographed image data and the photography environment information, as described separately. Also, in the event that the spectrum of the illumination light from the light source is known, the disperse reflection and specular reflection components may be separated, and the surface attributes may be estimated from the photographed image data and the photography environment information, without taking the 3-dimensional shape model into consideration.

(Obtaining Image Data)

The following is a description of obtaining image data. First, the image data obtaining unit 10 obtains image data from the photography device 1, and outputs this to the color information estimating unit 13.

Figure 3:
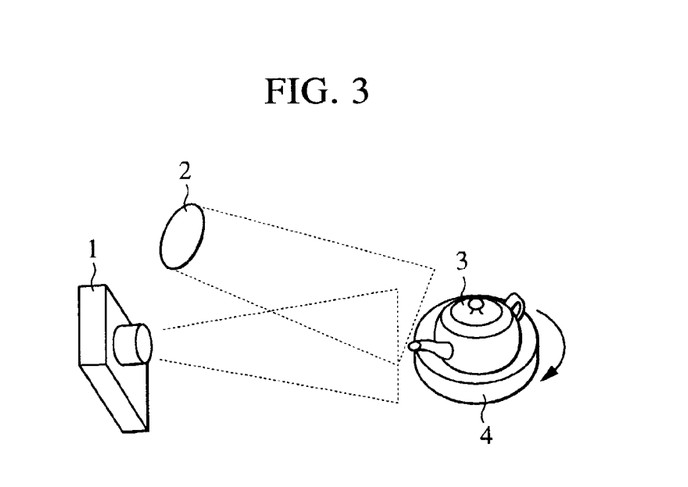
FIG. 3 is a diagram illustrating an example of obtaining image data of a real object with the 3-dimensional image processing system according to the first embodiment.

Now, photography of the subject 3 by the photography device 1 will be described with reference to FIG. 3. With the present embodiment, the subject 3 placed on the rotating stage 4 in a darkroom is illuminated with a constant illumination light cast from the area light source 2 having luminance distribution with a 2-dimensional expansion. Illuminating from the area light source having luminance distribution with a 2-dimensional expansion allows a finite and continuous distribution to be created at the incident angle of the illumination light cast on the subject 3, and thus a finite expansion is created in the direction of the reflected light off of the subject 3 due to specular reflection. Accordingly, failure to detect specular reflection on the subject 3 at the time of obtaining image data can be prevented, and further, estimation of surface attributes can be performed more accurately since continuous data can be obtained.

As for the size of the area light source 2, prevention of failure to detect specular reflection light can be effected in the event that the maximum solid angle of apparent size, when observing the area light source 2 from each part of the subject 3, is around 5° to 10°, or greater. Also, in the event of obtaining image data from subjects having parts with particularly small curvature radii, or subjects creating sharp specular reflection, the above maximum solid angle of apparent size is preferably 20° or greater. Also, the area light source 2 may be large enough to encompass the subject 3 if the area light source 2 has a dark portion around 5° to 10° or greater as observed from each part of the subject 3. Note that the form of the area light source is not restricted to a 2-dimensional planar form; rather, the area light source may be, for example, rod-shaped, ring-shaped, or any other shape so long as the apparent size viewed from each part of the subject 3 is equal to or greater than the above-described angles. Further, either a single area light source or multiple area light sources may be used for obtaining the image data.

The luminance distribution within the area light source 2 needs not be uniform over the entire surface thereof, as long as the luminance distribution is known or can be measured. Also, in the event that the apparent size is great when observing the area light source 2 from each part of the subject 3, to the extend of encompassing the subject 3, the luminance distribution is preferably not uniform over the entire solid angle.

The image data is obtained by rotating the rotating stage 4 while illuminating the subject 3 with the area light source 2, multiple shots are taken with the photography device 1 each time the rotating stage 4 rotates a certain rotational angle, and image data made up from the three color bands, R, G, and B, is obtained.

While carrying out this, the position (placement) of the photography device 1 and the subject 3 and the area light source 2, the luminance of the area light source 2 (the illumination light), the camera parameters (exposure time, sensibility, focal length, etc.) of the photography device 1, and other such photography environment information is recorded each time a photograph is taken.

Thus, performing photography multiple times while rotating the subject 3 changes the relative illumination direction and observation direction of the subject 3, yielding multiple images (an image group) taken changing the light source direction and line of view.

Note that while the present embodiment is described with reference to a case wherein the subject 3 is placed on a rotating stage 4, the subject may be placed on a device having multiple rotational axes. Also, while the present embodiment is described with reference to a case wherein the photography device 1 and the area light source 2 are fixed, with the subject 3 being rotated, arrangements may be made wherein the subject 3 is fixed and the position and/or the angle of the photography device 1 and/or the area light source 2 is changed, or wherein and the position and/or the angle of two or more of the photography device 1, the area light source 2, and the subject 3, is changed. In any case, any arrangement will suffice as long as multiple images with difference light source directions and/or lines of view can be obtained by changing or rotating positions.

(Obtaining Photography Environment Information)

The photography environment information obtaining unit 11 obtains photography environment information for each image photographed, such as information relating to the luminance distribution of the area light source 2 (illumination light), information relating to the camera parameters and settings of the photography device 1, information relating to the positions and attitudes of the photography device 1, the area light source 2, and the subject 3, and so forth, and outputs this to the coloring information estimating unit 13.

Note that part of the photography environment information may not be recorded at the time of photography, but rather estimated from the image data. As an example of a method for estimating photography environment information from the image data, a method may be used wherein markers fixed on the subject 3 at the time of photography are photographed along with the subject 3. With this method, the shape of the markers and the surface attributes are measured beforehand, and the photography environment information is estimated by photographing the markers along with the subject 3. Also, in the event that there are characteristic parts on the subject 3 of which shapes and surface attributes are known, and capable of substituting for the markers, the photography environment information may be estimated using these in place of the markers. The photography environment information thus estimated is output to the coloring information estimating unit 13.

(Obtaining 3-Dimensional Shape)

The 3-dimensional shape obtaining unit 12 generates a 3-dimensional shape model based on actual measurement data from the 3-dimensional measuring device 5, which is output to the coloring information estimating unit 13, as well as recording the 3-dimensional shape model in the model data storage unit 14.

Note that the 3-dimensional shape model may be obtained using a 3-dimensional scanner or the like at the time of image photography, or may be estimated from image data.

Or, in the event that shape data is known from CAD data or the like, such as with the case of industrial articles, that data may be used.

(Estimating Coloring Information)

Figure 4:
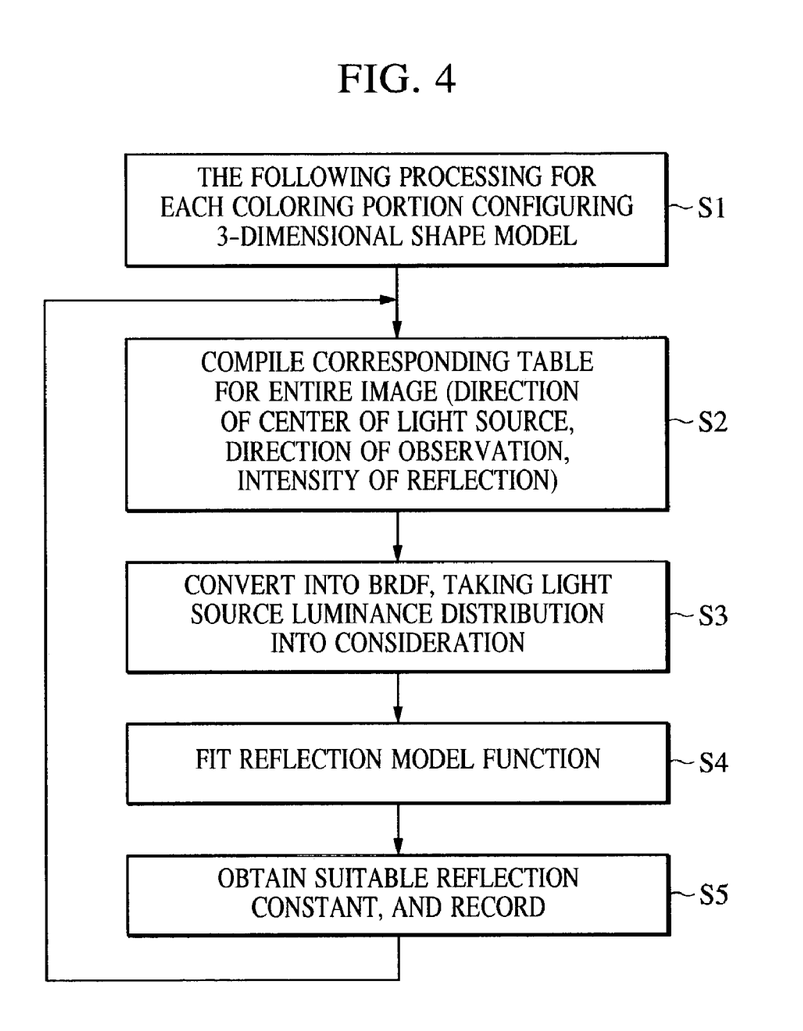
FIG. 4 is a flowchart illustrating processing for estimating color information with the 3-dimensional image processing system according to the first embodiment.

The coloring information estimating unit 13 estimates the coloring information which is the surface attributes information of the subject, based on the input information, and records reflection constants for the disperse reflection and specular reflection making up the surface attributes in the model data storage unit 14. The following is a method for estimating the coloring information, with reference to the flowchart in. FIG. 4.

First, in step S1, the flow starts. Subsequently, the following processing is repeated for each coloring portion (estimation portion) for which the coloring information of the surface of the 3-dimensional shape model is to be estimated.

In step S2, the set of the direction of the center of the light source, the direction of observation, and the reflection intensity, is calculated at each coloring portion and a table of the set is compiled. This is achieved by calculating the direction of the center of the light source at each coloring portion, the direction of observation, and the position on the image, from the positional information of the photography device 1, subject 3, and area light source 2 at the time of photography, and properties or settings information for the photography device 1 and area light source 2, and obtaining a BRDF' (lc , θo) which is an apparent BRDF which does not take into consideration the fact that the light source is an area light source for the lightness on the image. Here, the BRDF is represented as a function having the direction of the center of the light source lc and the observation direction θo as parameters thereof. Also, in the following description, values or functions containing a 2-dimensional luminance distribution of illumination light as a component thereof are indicated with a prime (').

In the event that the reflection intensity is unknown due to the plane being the back side on the image, behind other members, or outside of the image, this is not included in the table.

From step S3 on, tasks are carried out for estimating the real BRDF which is equivalent to a case wherein the incident angle to each part of the subject obtained by illumination such as a point light source or parallel light is concentrated, from the BRDF' which is the apparent BRDF obtained from the area light source 2. Specifically, the luminance distribution of the area light source is represented with the function l(r) of the relative direction r from the direction of the center of the light source at each coloring portion, the luminance distribution is deconvoluted based on the following expression, and converted into a bi-directional reflectance distribution function BRDF (θi, θo) yielding the reflectivity of light without 2-dimensional expansion, which is a function of illumination direction and observation direction.

Expression 1

Illumination luminance distribution $$BRDF'(\theta i, \theta o) = \int_r l(r) * BRDF(lc + r, \theta o) dr$$

Figure 5:
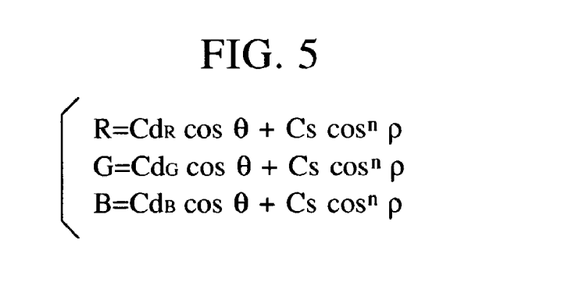
FIG. 5 shows expressions for a Phong reflection model function.

From step S4 on, fitting reflection model function to this BRDF is performed. In the present embodiment, the Phong reflection model function shown as a reflection model function in FIG. 5 is used. With the Phong reflection model function, the relation between the direction of center of the light source at each coloring portion, the observation direction, and reflection intensity, in the table obtained in the preceding step, is represented with the reflectivity $R_j$, $G_j$, and $B_j$, for each color band, and the angle variables $\theta_j$, and $\rho_j$ shown in FIG. 12.

Figure 12:
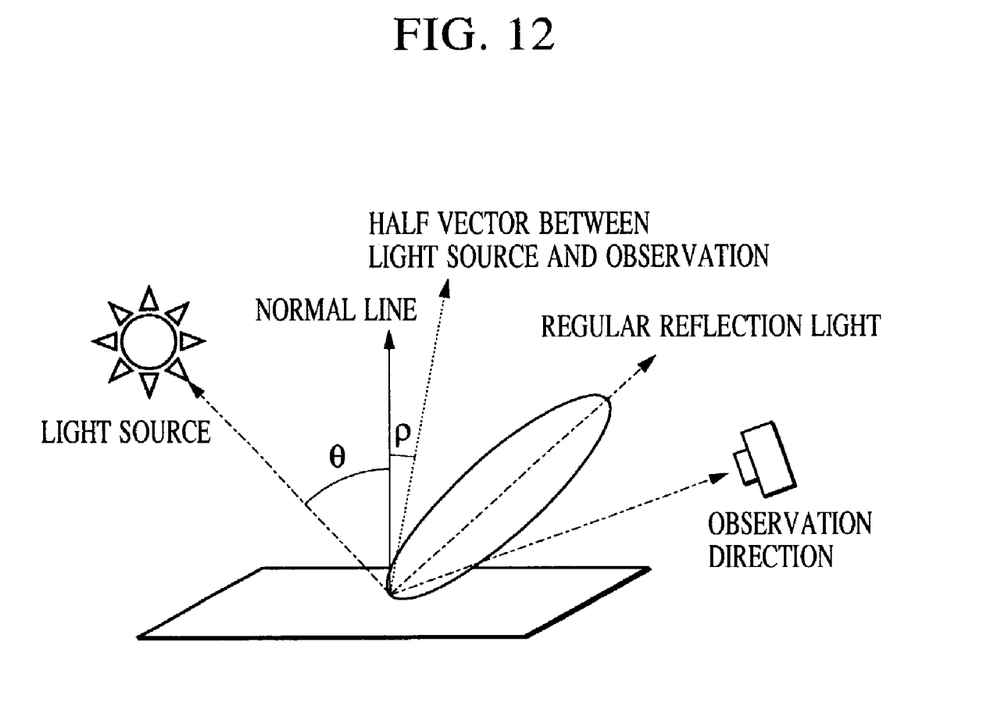
FIG. 12 is an explanatory diagram of the parameters θ and ρ used in the reflection model functions.

Note that in FIG. 12, θ is the angle between the surface normal and the direction to the center of the light source from a coloring portion, and ρ is the angle between the surface normal and half vector, which is an intermediate vector direction between the direction of observation (photography) by the photography device 1 the direction to and the center of the light source.

Now, the subscript j represents image Nos. 1, 2, and so on through m. Also, $Cd_R$, $Cd_G$, and $Cd_B$ are diffuse reflection constants, with Cs,n being a specular reflection constant. With an error vector as ε, this yields the determinant shown in FIG. 10. In the event that the reflectivity at the coloring portion is unknown, the corresponding set is deleted from the table.

Next, in step S5, a set of constants optimal for fitting the table with a reflection model function, i.e., the set ($Cd_R$, $Cd_G$, $Cd_B$, Cs', σ') is decided, and recorded in the model data storage unit 14. Various types of mathematical approaches may be used for optimization; the present invention does not restrict the approach used here.

As an example, in the event of using the least-square method, the performance function is |ε|, the length of the error vector ε, and a set wherein the performance function is minimum is obtained. Though the performance function handles all errors as being equivalent, a performance function may be set which takes into consideration the reliability of each of the values. Particularly, weighting proportionate to cos θi and cos θo is effective. This processing is performed for all coloring portions.

A 3-dimensional image is reproduced by combining the 3-dimensional shape model, and the data relating to the surface attributes of each part of the 3-dimensional shape model represented by the reflection model function constants, thus obtained.

(Reproduction by Computer Graphics)

The following is a description of the steps for generating and displaying the subject 3 as 3-dimensional computer graphics, using the model data. At the computer graphics generating device 7, information relating to the observational position and the position of the subject in a virtual space, and information relating to a virtual light source (position, direction, color, illuminance, etc.), are input. Next, this information is substituted into the 3-dimensional shape model and the reflection model function which is the surface attributes at each portion of the 3-dimensional shape model obtained above, and how the subject would be observed under the input observation environment is calculated. The product of the calculated reflectivity and illumination illuminance is drawn on the display position on the generated image as a display color. Thus, natural shadow and highlights under arbitrary illumination conditions and direction of line of view are realized.

Note that while the present embodiment has been described with reference to an arrangement wherein the camera 1, area light source 2, rotating stage 4, 3-dimensional measuring device 5, 3-dimensional image processing device 6, and computer graphics generating device 7 are separate, these may be configured integrally.

Also, in the event of configuring a 3-dimensional image processing system with multiple devices or pieces of equipment as with the present embodiment, exchange of data between the devices or equipment is carried out by means such as various types of recording media, wireless or cable data communication means, and so forth.

Particularly, providing the 3-dimensional image processing device 6 and computer graphics generating device 7 as separate devices is advantageous in that model data once created can be repeatedly used with multiple computer graphics generating devices.

Also, with the present embodiment, the reflection model function has been described as being a Phong reflection model function, but the present invention is by no means restricted to this reflection model function; rather, other reflection model functions may be used instead, such as the Torrance-Sparrow model, for example. That is to say, any such reflection model function may be used with the present invention so long as the reflectivity is represented as one or multiple constants and angle variables.

Also, while the present embodiment has been described with reference to an case wherein the image is made up of the three colors, R, G, and B, the present embodiment may use any arrangement as long as corresponding reflection model functions can be described, such as one color, other multiple colors, spectrum information, polarization information, etc.

Further, the coloring information estimating method described in the present embodiment does not guarantee that reflection constants are uniquely obtained for all portions, but in such portions, techniques can be used such as interpolation of coloring portions having unobtainable constants based on reflection constants at nearby coloring portions, substituting a typical value, and so forth.

Second Embodiment

The above first embodiment has been described with reference to a process for deconvoluting the apparent BRDF relating to the real object with the luminance distribution of the illumination light in order to estimate reflection constants in the reflection model function, when approximating the BRDF with a predetermined reflection model function. Conversely, with the present embodiment, a technique will be described wherein an area light source having a 2-dimensional luminance distribution capable of being approximately with Gaussian distribution, and also wherein a Gaussian distribution type reflection model function is used. Such a configuration simplifies the computation for deconvoluting the apparent BRDF into the actual BRDF.

The configuration of the 3-dimensional image processing system for performing the processing with the present embodiment is the same as that described with the first embodiment, so the devices and equipment making up the system are denoted with the same reference numerals.

The following is a description of the processing steps with the 3-dimensional image processing system according to the present embodiment.

(Obtaining Image Data, etc.)

Figure 6:
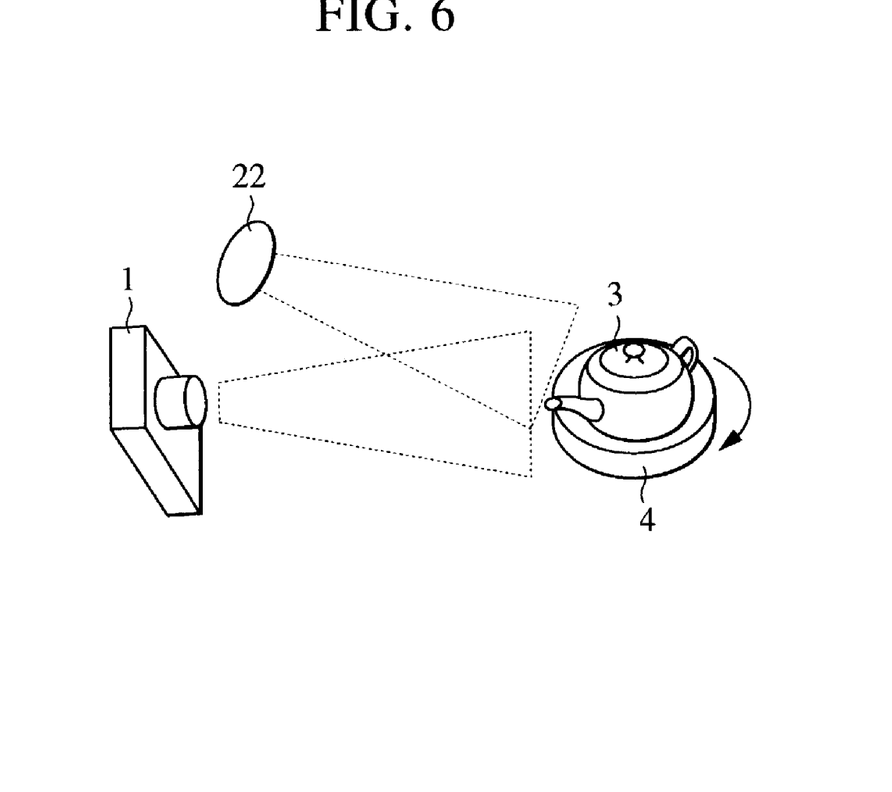
FIG. 6 is a diagram illustrating an example of obtaining image data of a real object with the 3-dimensional image processing system according to a second embodiment of the present invention.

FIG. 6 shows an overview of the configuration for obtaining image data with the present embodiment. With the present embodiment, an area light 22 having a luminance distribution with 2-dimensional expansion, wherein the luminance distribution thereof is approximated Gaussian distribution with an angle radius $\sigma_L$, is used as the light source for illuminating a subject 3. Such an area light 22 can be configured using frosted glass with a spotlight casting light from behind, for example.

The luminance distribution here is a distribution on a sphere wherein illumination is projected from each direction viewing the area light source 22 from each portion of the subject 3, and since this is in planar approximation with the region wherein the area light source is projected on the sphere with the present embodiment, the maximum angle therein should be 5° to 10° or more, but 90° or less.

Multiple sets of image data relating to the subject 3 are obtained at the image data obtaining unit 10 from the photography device 1, using such an area light source 22, and the information is output to the coloring information estimating unit 13.

The photography environment information obtaining unit 11 obtains photography environment information such as information relating to the luminance distribution of the area light source 22 (illumination light), information relating to the properties and/or settings of the photography device 1 information relating to the position and/or attitude of the photography device 1, subject 3, and area light source 22, and so forth, each time a photograph is taken, and outputs the photography environment information to the coloring information estimating unit 13.

At this time, part of the photography environment information may not be recorded at the time of photography, but rather estimated from the image data, as described with the first embodiment.

The 3-dimensional shape obtaining unit 12 generates a 3-dimensional shape model based on actual measurement data from the 3-dimensional measuring device 5, which is output to the coloring information estimating unit 13, as well as recording the 3-dimensional shape model in the model data storage unit 14, as with the first embodiment.

(Estimating Coloring Information)

The coloring information estimating unit 13 estimates the coloring information which is the attributes information of the subject, based on the input information, and records reflection constants for the disperse reflection and specular reflection making up the surface attributes in the model data storage unit 14. The following is a method for estimating the coloring information, with reference to the flowchart in FIG. 9.

Figure 9:
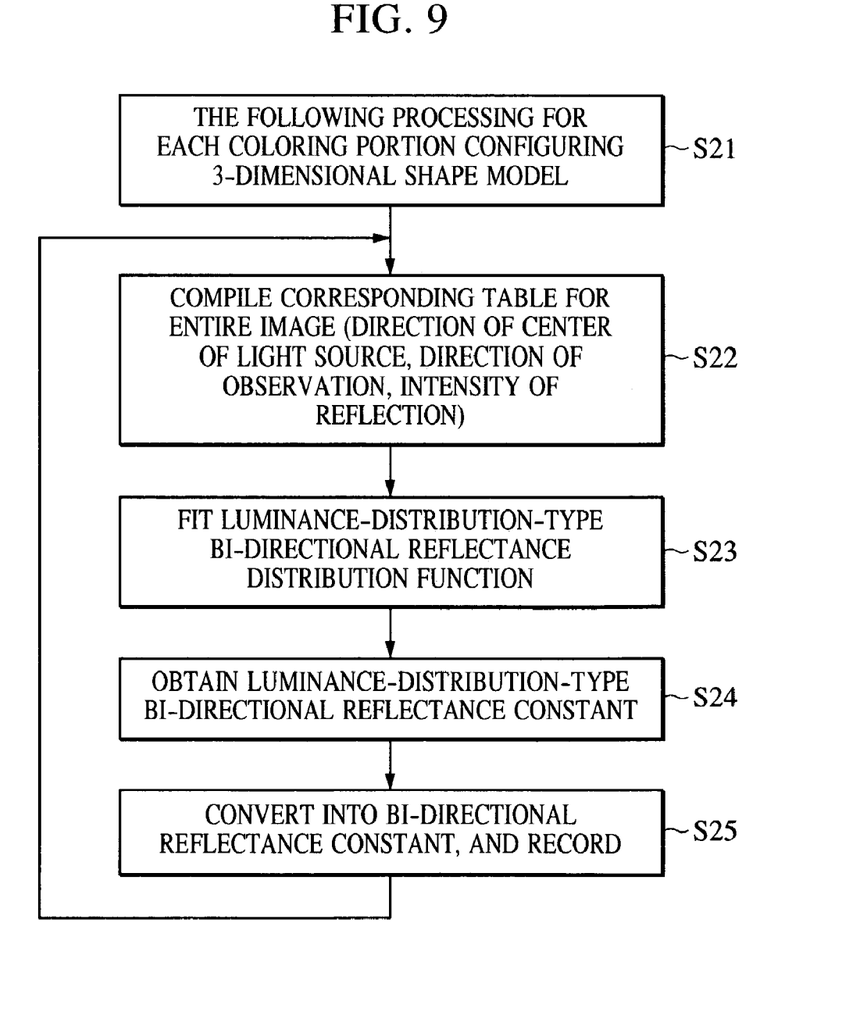
FIG. 9 is a flowchart illustrating processing for estimating color information with the 3-dimensional image processing system according to the second embodiment.

First, in step S21, the flow starts. Subsequently, the following processing is repeated for each coloring portion (estimation portion) for which the coloring information of the surface of the 3-dimensional shape model is to be estimated.

In step S22, the correlation of the direction of the center of the light source at each coloring portion, the direction of observation, and the reflection intensity, is calculated and a correlation table is compiled. This is achieved by calculating the direction of the center of the light source at each coloring portion, the direction of observation, and the position on the image, from the positional information of the photography device 1, subject 3, and area light source 22 at the time of photography, and properties or settings information for the photography device 1 and area light source 22, and obtaining the reflection intensity for each portion of the subject from the lightness on the image.

In the event that the reflection intensity is unknown due to the plane being the back side on the image, behind other members, or outside of the image, this is not included in the correlation table.

Figure 7:
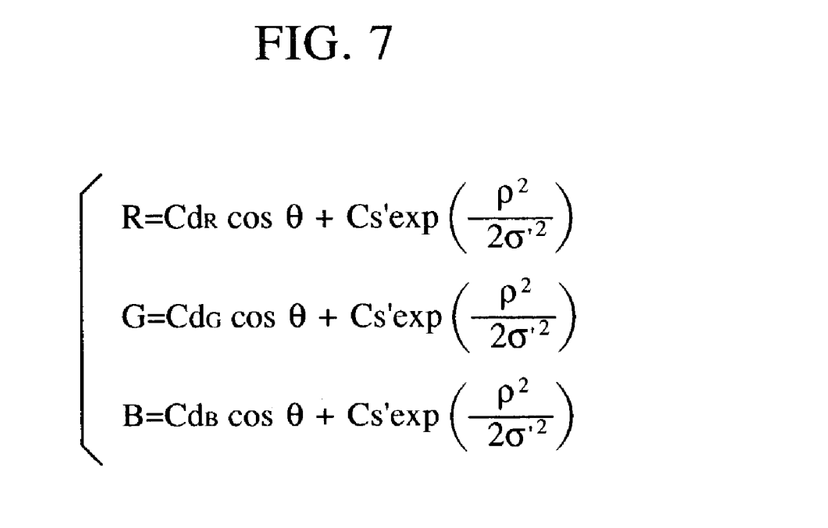
FIG. 7 shows expressions for a Gaussian distribution-type luminance distribution reflection model function.

Next, in step S23, in order to express the correlation table as BRDF' which is the apparent BRDF, approximation is made with the Gaussian distribution type luminance-distribution-type reflection model function shown in FIG. 7, for example, the correlation between the direction of center of light source at each coloring portion, the observation direction, and reflection intensity, in the correlation table obtained in the preceding step, is represented with the reflectivity $R_j$, $G_j$, and $B_j$, for each color band, and the angle variables $\theta_j$, and $\rho_j$ shown in FIG. 12.

The subscript j represents image Nos. 1, 2, and so on through m. Also, $Cd_R$, $Cd_G$, and $Cd_B$ are diffuse reflection constants, with $C_{S,\sigma}$ being a specular reflection constant. With an error vector as $\epsilon$, this yields the determinant shown in FIG. 11. In the event that the reflectivity at the coloring portion is unknown, the corresponding line is deleted from the determinant.

Next, in step S24, a set of constants optimal for approximating the correlation table with a reflection model function, i.e., the set ($Cd_R$, $Cd_G$, $Cd_B$, Cs', $\sigma$') is decided. Various types of mathematical approaches may be used for optimization; the present invention does not limit the approach used here.

As an example, in the event of using the least-square method, the performance function is |$\epsilon$|, the length of the error vector $\epsilon$, and a set wherein the performance function is minimum is obtained. Though the performance function handles all errors as being equivalent, a performance function may be set which takes into consideration the reliability of each of the values.

Next, in step S25, the Gaussian distribution type luminance-distribution-type reflection model function obtained in step S24 is converted into a reflection model function relating to the light source, such as a point light source or a parallel (infinite-distance) light source wherein the incident angle to each portion of the subject is constant.

Figure 8:
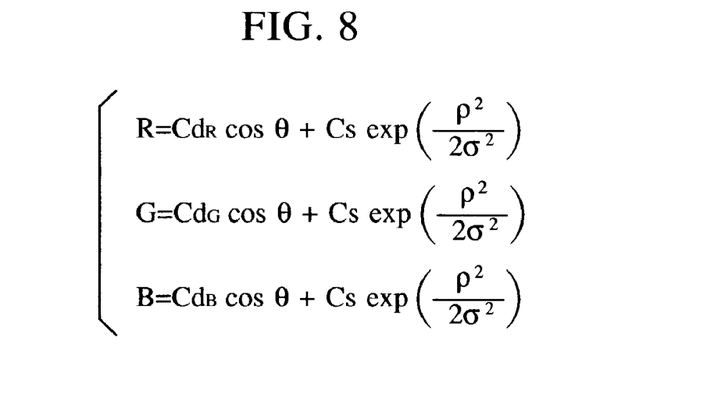
FIG. 8 shows expressions for a Gaussian distribution-type reflection model function.

The Gaussian distribution type reflection model function shown in FIG. 8 is used for the reflection model function. At this time, the disperse reflection component is taken to be practically unaffected by the expansion of the illumination light, and the aforementioned $Cd_R$, $Cd_G$, and $Cd_B$ are recorded in the model data storage unit 14. Also, for the specular reflection component, as is obtained by the following expression which is a Gaussian distribution function synthesizing rule, and Cs and $\sigma$ are recorded in the model data storage unit 14.

$$\sigma'^2 = \sigma s^2 + \sigma_L^2$$

$$\sigma^2 Cs = \sigma'^2 Cs'$$

Here, $\sigma$ represents the standard deviation of the reflection model function, $\sigma$' represents the standard deviation of the luminance-distribution-type reflection model function, and $\sigma_J$ represents the apparent Gauss radius of the luminance distribution of the illumination light.

The above-described processing is performed for all coloring portions.

(Reproduction by Computer Graphics)

A 3-dimensional image can be reproduced in the same way as with the first embodiment, using the above-obtained 3-dimensional shape model and the reflection model function which is the surface attributes of each portion on the 3-dimensional shape model.

While the present embodiment has been described using a Gaussian distribution type reflection model function for the reflection model function, there are cases wherein a Phong reflection model function is handier at the time of reproduction by computer graphics. A Gaussian reflection model function and Phong reflection model function can be correlated very closely by the conversion expression:

$$\sigma^2 = 1/(n+5/6).$$

This may be used to record n instead of $\sigma$ in step S26.

Also, while the present embodiment has been described with reference to an case wherein the image is made up of the three colors, R, G, and B, the present embodiment may use any arrangement as long as corresponding reflection model functions can be described, such as one color, other multiple colors, spectrum information, polarization information, etc.

Further, the coloring information estimating method described in the present embodiment does not guarantee that all reflection constants are uniquely obtained, but in such a case, techniques can be used such as interpolation of coloring portions having unobtainable constants based on reflection constants at nearby coloring portions, substituting a typical value, and so forth.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A 3-dimensional image processing method, which obtains 3-dimensional image data for reproducing an object as a 3-dimensional image, comprising:

a first step, of obtaining photographed image data from a photography device by illuminating an object with an area light source having luminance distribution with 2-dimensional expansion as observed from the surface of the object; and a second step, of estimating surface attributes of said object from photographed image data obtained in said first step and photography environment information existing at the time the photographed image data is obtained in said first step, wherein, in said second step, a luminance-distribution-type bi-directional reflectance distribution function, which indicates the distribution of reflectivity for illumination light having a predetermined distribution as to the incident angle for each portion of the object, is estimated, following which the luminance-distribution-type bi-directional reflectance distribution function is converted into a bi-directional reflectance distribution function which yields the reflectance of each portion on the surface of the object for the illumination light with a concentrated incident angle to the object, and wherein both the luminance distribution at the light source portion of the area illumination light and the specular reflection components of the luminance-distribution-type bi-directional reflectance distribution function can be described by Gaussian distribution, and wherein the standard deviation of the specular reflection component of said bi-directional reflectance distribution function is obtained by the following relational expression:

$$\sigma'^2 = \sigma^2 + \sigma_L^2,$$

wherein $\sigma$' represents the standard deviation of the specular reflection component of luminance-distribution-type bi-directional reflectance distribution function, and $\sigma_L$ represents the standard deviation of apparent luminance distribution at the light source portion of illumination light.

2. A 3-dimensional image processing device, which obtains 3-dimensional image data for reproducing an object as a 3-dimensional image, comprising:

image data obtaining means, for obtaining photographed image data from a photography device by illuminating an object with an area light source having luminance distribution with 2-dimensional expansion as observed from the surface of the object; and surface attributes estimating means, for estimating surface attributes of the object from photographed image data obtained by the image data obtaining means and photography environment information existing at the time the photographed image data is obtained by said image data obtaining means, wherein, by said surface attributes estimating means, a luminance-distribution-type bi-directional reflectance distribution function, which indicates the distribution of reflectivity for illumination light having a predetermined distribution as to the incident angle for each portion of the object, is estimated, following which the luminance-distribution-type bi-directional reflectance distribution function is converted into a bi-directional reflectance distribution function which yields the reflectance of each portion on the surface of the object for the illumination light with a concentrated incident angle to the object, and wherein both the luminance distribution at the light source portion of the area illumination light and the specular reflection component of the luminance-distribution-type bi-directional reflectance distribution function can be described by Gaussian distribution, and wherein the standard deviation of the specular reflection component of the bi-directional reflectance distribution function is obtained by the following relational expression:

$$\sigma'^2 = \sigma^2 + \sigma_L^2,$$

wherein $\sigma'$ represents the standard deviation of the specular reflection component of luminance-distribution-type bi-directional reflectance distribution function, and $\sigma_L$ represents the standard deviation of apparent luminance distribution at the light source portion of illumination light.

3. A 3-dimensional image processing program embodied on a computer-readable medium, which obtains 3-dimensional image data for reproducing an object as a 3-dimensional image, comprising:

code for a first step, of obtaining photographed image data from a photography device by illuminating an object with an area light source having luminance distribution with 2-dimensional expansion as observed from the surface of the object; and code for a second step, of estimating surface attributes of said object from photographed image data obtained in said first step and photography environment information existing at the time the photographed image data is obtained in said first step, wherein, in said second step, a luminance-distribution-type bi-directional reflectance distribution function, which indicates the distribution of reflectivity for illumination light having a predetermined distribution as to the incident angle for each portion of the object, is estimated, following which the luminance-distribution-type bi-directional reflectance distribution function is convened into a bi-directional reflectance distribution function which yields the reflectance of each portion on the surface of the object for the illumination light with a concentrated incident angle to the object, and wherein both the luminance distribution at the light source portion of the area illumination light and the specular reflection component of the luminance-distribution-type bi-directional reflectance distribution function can be described by Gaussian distribution, and wherein the standard deviation of the specular reflection component of said bi-directional reflectance distribution function is obtained by the following relational expression:

$$\sigma'^2 = \sigma^2 + \sigma_L^2,$$

wherein $\sigma'$ represents the standard deviation of the specular reflection component of luminance-distribution-type bi-directional reflectance distribution function, and $\sigma_L$ represents the standard deviation of apparent luminance distribution at the light source portion of illumination light.

* * * * *

UNITED STATES PATENT AND TRADEMARK OFFICE
CERTIFICATE OF CORRECTION

PATENT NO. : 7,200,262 B2
APPLICATION NO. : 10/321461
DATED : April 3, 2007
INVENTOR(S) : Yasuhiro Sawada It is certified that error appears in the above-identified patent and that said Letters Patent is hereby corrected as shown below:

COLUMN 14:

Line 16, "convened" should read --converted--.

Signed and Sealed this

First Day of April, 2008

JON W. DUDAS
*Director of the United States Patent and Trademark Office*